UNITED STATES PATENT OFFICE.

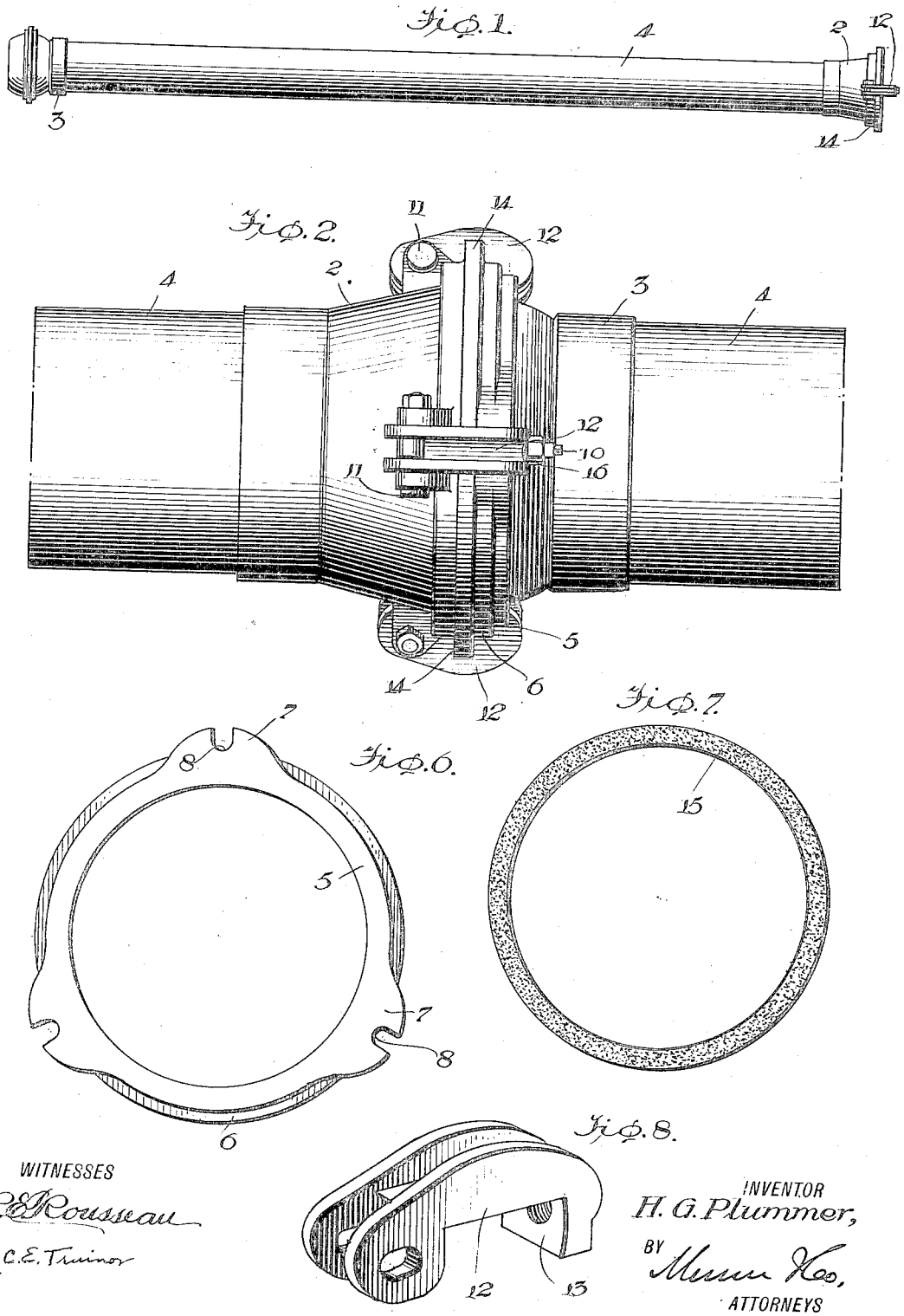

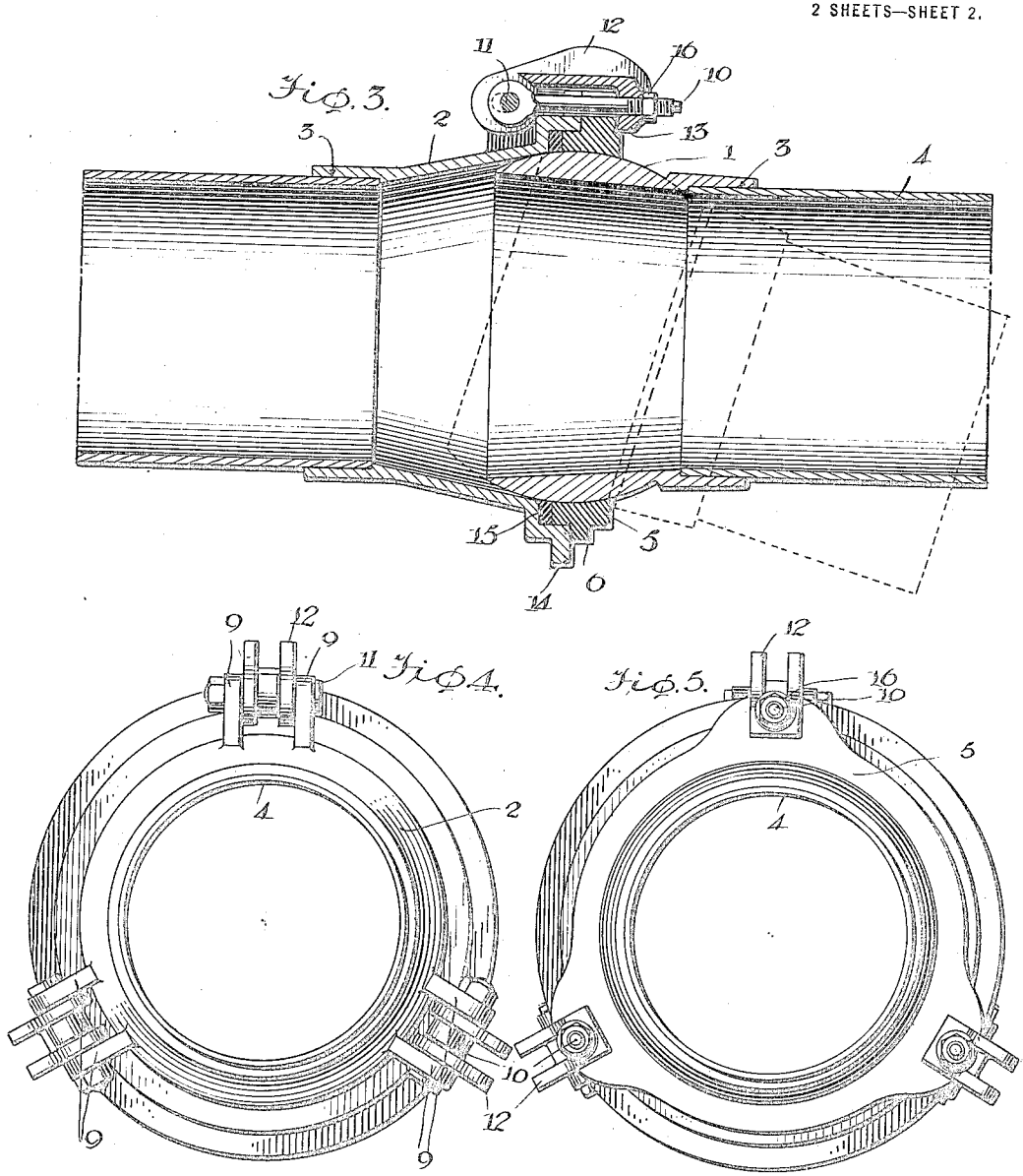

HENRY GUION PLUMMER, OF OAKLAND, CALIFORNIA.

PIPE-JOINT.

1,397,145.  Specification of Letters Patent.  Patented Nov. 15, 1921.

Application filed July 21, 1920. Serial No. 397,900.

*To all whom it may concern:*

Be it known that I, HENRY GUION PLUMMER, a citizen of the United States, and a resident of Oakland, in the county of Alameda and State of California, have invented certain new and useful Improvements in Pipe-Joints, of which the following is a specification.

My invention relates to pipe joints and more particularly to joints of the ball and socket type particularly adapted, although not necessarily, for use in dredge floating pipes.

The purpose of my invention is the provision of a joint for dredge floating pipes which is flexible under any and all conditions, effectively lubricated, and one which successfully withstands all stresses to which it is subjected.

In the drawing,—

Figure 1 is a plan view of a section of pipe having the improved connection, the ball at one end and the bell at the other.

Fig. 2 is a plan view of the joint,

Fig. 3 is a longitudinal section through the joint,

Fig. 4 is an end view at the bell end,

Fig. 5 is a view looking at the ball end,

Fig. 6 is a front view of the socket ring,

Fig. 7 is a similar view of the gasket.

Fig. 8 is a perspective view of one of the latches,

Fig. 9 is a plan view of one of the eye bolts.

In the present embodiment of the invention, the improved joint consists of a ball member 1, and a bell member 2, each of which is shaped at one end, as indicated at 3, to engage the pipe section 4, and the said ends are secured to the said pipe section in any suitable or desired manner.

A socket ring 5 is arranged on the ball member 1 and in such manner that it spans the greatest diameter of the ball member, whereby the ring is mounted to be movable on the ball to occupy any position while at the same time it is locked positively against removal from the ball.

In forming and assembling the socket ring and ball member, the latter is turned to an accurate spherical surface and the outlet end faced to a prescribed distance from the axis of the ball. The socket ring is bored to the same radius as the ball plus a few thousandths of an inch, depending on the diameter which will allow it to move freely over the ball surface. The ball casting is stood on end on a surface table, the outlet end down. The ring is then heated to about 1600° Far., and after removing the scale from the machined surface of the bore, is placed in position over the ball, resting on machined metal blocks to hold the ring in proper position for shrinking, so it will not grab the ball before being finally cooled. It is then allowed to cool and shrink, which completes the operation.

The socket ring has an external, peripheral rib 6, the said rib being central, as shown, and the socket ring is provided with radial, rounded lugs 7, at points 120 degrees from each other. These lugs have radial notches, as shown at 8, for a purpose to be presently described.

The ball member 2 has pairs of radial lugs 9 spaced in the same manner as the lug 7, and between each pair of lugs there is pivoted an I-bolt 10. These lugs have openings, as shown, for receiving the bolt 11, which pivotally connects the eye-bolt to the lugs 9.

Latch members 12 are also pivoted on the bolt 11. Each latch member, as shown more particularly in Fig. 8, is composed of 2 members spaced apart from each other, and connected at one end by an integral web 13, and this web is provided with an opening for receiving the I-bolt 10. At the other end, the latch member has elongated opening 14 for receiving the bolt 11 before mentioned, and it will be evident that the elongated openings permit a limited movement of the latch member longitudinal of the pipe.

The bell member 2 has a radial flange 14 at the end adjacent to the ball section, and this flange, as shown in Fig. 3, consists of 2 portions offset laterally with respect to each other and integrally connected. This arrangement provides a species of pocket, or internal annular shoulder, and within this pocket is arranged a gasket 15 of suitable material, the gasket being between the flange and the ring 5. The rib 6 of the socket ring 5 abuts the flange 14, and the I-bolts and latch members connect the ring to the flange and to the socket section. A nut 16 is threaded on to each of the I-bolts, the nut engaging the outer face of the integral web 13.

In operation, to connect the pipe sections—it being understood that the socket ring 5 has been placed—the gasket 15 is inserted, and sections are pushed together. The nuts 16 are loosened, and the latch members are swung into place, the flange 14 being also radially notched to receive the I-bolts. The latch 12 engages that face of the socket ring remote from the bell member, the lost motion connection between the latch and the bolt 11 permitting the easy engagement of the latch member with the socket ring, and it will be evident that when the nuts 16 are tightened, the ring 5 will be forced tightly against the flange 14, and against the gasket, firmly connecting the two sections.

Referring to Fig. 3, it will be seen that those portions of the socket ring 5 which are engaged by the webs 13 of the latches are convex and the engaging faces of the web 13 are concave to fit these convexities, to permit the easy engagement and disengagement of the latches, as well as to prevent any tendency for the I-bolt to disengage or slip off from the ring lug when under stress or pressure.

With the above construction, jamming and freezing troubles are eliminated, first by doing away with the personal equation in tightening the socket on the ball, second, eliminating any chance of distortion in the ring by reason of its shape, its stiffness, and the method of fitting it on the ball, third, the free movement of the ball inside the ring, which free movement will obtain under stress conditions, due to sea action or pressure in the pipe by reason of the socket and the ball not being subject to distortion, or to the personal equation in connecting and disconnecting.

I claim:—

1. A pipe joint consisting of a ball section for connection with one end of a pipe section, and a socket section for connection with the other end, and adapted to receive the ball section of the adjacent pipe section, a ring fitting on the ball section and of such diameter that it cannot move over the ball section to become disengaged therefrom, while at the same time it is rotatable on the ball section, and means for locking the socket section to the ring, said means comprising I-bolts pivoted to the socket, the ring having radial notches for receiving the bolts, and latch members having lost-motion connections with the socket sections and movable longitudinally thereof and having means for engaging the opposite face of the ring from the socket section, and a nut threaded on to each I-bolt.

2. A pipe joint consisting of a ball section for connection with one end of a pipe section, and a socket section for connection with the other end, and adapted to receive the ball section of the adjacent pipe section, a ring fitting on the ball section and of such diameter that it cannot move over the ball section to become disengaged therefrom, while at the same time it is rotatable on the ball section, and means for locking the socket section to the ring, said means comprising latch members having lost-motion connections with the socket section, and having means for engaging the opposite face of the ring from the socket section, and means for moving the latches longitudinally of the socket section.

3. A pipe joint comprising a ball section having a machined outer surface, a socket section receiving the ball section and of sufficient width to extend past the crown of the ball section in both directions whereby when fitted thereon it will be held irremovable but can be moved freely upon the ball section, the said ring having its inner surface machined to conform to the ball section and shrunk upon the ball section whereby it will be irremovable when fitted thereon as and for the purposes set forth.

4. A pipe joint comprising a ball section, and a socket section formed of a single piece of metal having its working surface machined to snugly fit the ball section and shrunk to movably embrace the ball section but irremovable therefrom.

5. A method of forming ball and socket joints which consists in machining the surface of the ball section and socket section so that the internal diameter of the socket section is slightly in excess of the external diameter of the ball section, heating the socket section and then removing the scale therefrom, and finally placing the socket section while heated over the ball section so that when cooled the socket section shrinks to movably embrace the ball section but is irremovable therefrom.

6. A method of forming ball and socket joints which consists in forming the socket section of an internal diameter slightly exceeding the external diameter of the ball section, and then shrinking the socket section so that it movably embraces the ball section but is irremovable therefrom.

HENRY GUION PLUMMER